United States Patent
Okuyama et al.

(10) Patent No.: US 8,035,268 B2
(45) Date of Patent: Oct. 11, 2011

(54) INSULATING BOBBIN FOR STATOR OF ROTARY MACHINE

(75) Inventors: Takenari Okuyama, Zama (JP); Tatsuya Imai, Yamato (JP); Kunitomo Ishiguro, Odawara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 336 days.

(21) Appl. No.: 12/256,870

(22) Filed: Oct. 23, 2008

(65) Prior Publication Data

US 2009/0127969 A1    May 21, 2009

(30) Foreign Application Priority Data

Oct. 31, 2007    (JP) ................................ 2007-283036

(51) Int. Cl.
*H02K 3/34* (2006.01)
*H02K 3/48* (2006.01)
*H02K 1/06* (2006.01)

(52) U.S. Cl. ................. 310/215; 310/214; 310/216.005; 310/216.063

(58) Field of Classification Search .......... 310/213–216, 310/216.005, 216.063
See application file for complete search history.

(56) References Cited

U.S. PATENT DOCUMENTS

| 2004/0245882 A1 | 12/2004 | Horie et al. |
| 2006/0006758 A1* | 1/2006 | Yamada ........................ 310/194 |
| 2006/0022549 A1 | 2/2006 | Otsuji |

FOREIGN PATENT DOCUMENTS

| CN | 1578064 A | 2/2005 |
| EP | 1742327 A1 | 1/2007 |
| JP | 2-26359 U | 2/1990 |
| JP | 3679305 B2 | 5/2005 |
| JP | 2006296146 A * | 10/2006 |

OTHER PUBLICATIONS

Machine Translation JP2006296146 (2006).*

* cited by examiner

*Primary Examiner* — Quyen Leung
*Assistant Examiner* — Jose Gonzalez Quinones
(74) *Attorney, Agent, or Firm* — Foley & Lardner LLP

(57) ABSTRACT

An insulating bobbin for disposition between a stator core and a stator winding of a stator of a rotating machine, the stator winding being wound around the stator core by way of the insulating bobbin, the insulating bobbin comprising a coil end section at which an end portion of the stator winding is disposed, a slot side section forming a slot for winding thereon the stator winding, and a corner section having a curved surface and connecting between the coil end portion and the slot side portion, the corner section having a first radius of curvature at a side closer to the coil end section and a second radius of curvature at a side closer to the slot side section, the second radius of curvature being larger than the first radius of curvature.

21 Claims, 10 Drawing Sheets

INSULATING BOBBIN FOR STATOR OF ROTARY MACHINE

BACKGROUND OF THE INVENTION

The present invention relates to a stator of a rotary machine and particularly to an insulating bobbin fitted on a stator core of the stator for winding a stator winding on the stator core.

A rotary machine consists of a stator fixedly disposed inside a casing and a cylindrical rotor installed on a rotating shaft to rotate together therewith. The stator includes a hollow, cylindrical stator core and a stator winding, in which the stator core has a tooth portion (pole tooth portion) on which an insulation bobbin is fitted and the stator winding is wound around the tooth portion by way of the insulating bobbin.

Herein, the insulating bobbin has a coil wound portion, an inner flange portion and an outer flange portion. The coil wound portion is in the form of a rectangular frame and fitted on the tooth portion having a rectangular cross section. The inner flange portion and the outer flange portion are formed integral with the coil wound portion and in such a way as to extend along the inner and outer edges of the coil wound portion, respectively. The coil wound portion has a slot side section, a coil end section and a corner section. The slot side section forms a winding slot for winding thereon a stator winding while insulating the same. At the coil end section is disposed an end portion of the stator winding. The corner section connects between the slot side section and the coil end section. At the corner section, the insulating bobbin and the stator winding are brought into contact with each other strongly, by the tension of the stator winding caused at the time of its winding. Due to this, the insulation coating of the stator winding or the insulating bobbin may be damaged by being pushed by the stator winding. As a result, there may possibly occur an insulation failure of the stator winding or breakage of the inner flange portion of the insulation bobbin, which starts at the place where the insulation bobbin is damaged by a large stress applied thereto at the time of a magnetizing process.

Further, since the slot side section of the insulating bobbin is generally thin, the corner section is liable to be cracked to cause an insulation failure of the insulating bobbin.

An example of a related technique for solving such a problem is disclosed by a Japanese Patent No. 3679305 titled "Cooling Medium Compressor". In the cooling medium compressor, it is aimed to relieve the stress which is caused due to bending of a stator winding and applied to a corner section of a coil wound portion of a direct-wound type insulating bobbin. To this end, it is proposed to round the corner section of the coil wound portion so that the rounded corner section has a curved surface shape formed by a circular arc of a radius in the range from ½ to 4 times of the diameter of the stator winding wire. By such rounding, it becomes possible to attain improved protection of the insulation layer of the stator winding and the insulating bobbin against damage, and it becomes possible to prevent occurrence of an insulation failure and breakage of the insulating bobbin at the time of magnetization.

SUMMARY OF THE INVENTION

However, in case the corner section of the coil wound portion of the insulating bobbin is rounded so as to form a part of a circle of a radius in the range from ½ to 4 times of the diameter of the stator winding wire, there is caused a space between the insulating bobbin and the stator winding, due to so-called "wound expansion". Namely, according to the above-described patent, the corner section is rounded to have, when viewed in cross section, a curved shape comprised of only a simple and single circular arc. For this sake, when the stator wire is bent at the rounded corner section and wound thereon, a space between the insulating bobbin and the stator winding due to reaction of the stator winding is caused at the slot side portion that constitutes the stator winding-wound slot and at the coil end section at which an end portion of the stator winding is located. Since the space is low in the heat conductivity, there arises a problem that the heat generated by the stator winding is not radiated but remains inside the stator winding.

It is accordingly an object of the present invention to prevent formation of a space between the insulating bobbin and the stator winding and thereby prevent the heat generated by the stator winding from remaining inside the stator winding.

To achieve the above object, the present invention provides an insulating bobbin for disposition between a stator core and a stator winding of a stator of a rotating machine, the stator winding being wound around the stator core, the insulating bobbin comprising a coil end section at which an end portion of the stator winding is disposed, a slot side section forming a slot for winding thereon the stator winding, and a corner section having a curved outer surface and connecting between the coil end section and the slot side section, the corner section having a first radius of curvature at a side closer to the coil end section and a second radius of curvature at a side closer to the slot side section, the second radius of curvature being larger than the first radius of curvature.

By the insulating bobbin of this invention, the second radius of curvature at the side of the corner section closer to the slot side section is made larger than the first radius of curvature at the side closer to the coil end section. For this sake, at the time the stator winding that extends from the coil end section side to the slot side section is bent and wound around the insulating bobbin, the reaction of the stator winding can be suppressed as compared with that caused in case the stator winding is wound around a corner section that is simply rounded by the first radius of curvature. By this, the possibility of a space being caused due to "wound expansion" can be reduced. Further, as compared with the corner section that is simply rounded by the second radius of curvature, it becomes possible to attain a sufficient thickness of the corner section while inhibiting increase in the thickness of the slot side section since the corner section is further rounded at a side closer the coil end section by the first radius of curvature that is smaller than the second radius of curvature. By this, it becomes possible to inhibit decrease in the number of turns of a stator winding wound around the insulating bobbin and thereby inhibit decrease in the output torque ability of the rotating machine.

According to another aspect of the present invention, there is provided an insulating bobbin for disposition between a stator core and a stator winding of a stator of a rotating machine, the stator winding being wound around the stator core by way of the insulating bobbin, the insulating bobbin comprising a coil end section at which an end portion of the stator winding is disposed, a slot side section forming a slot for winding thereon the stator winding, a corner section having a curved surface and connecting between the coil end section and the slot side section, and means for reducing a gap which is caused between the stator winding and one of the coil end section and the slot side section when the stator winding is wound around the stator core, wherein the corner section has a first radius of curvature at a side closer to the coil end section and a second radius of curvature at a side closer to the slot side section, the second radius of curvature being larger than the first radius of curvature, and wherein the first radius of curvature and the second radius of curvature of the corner section constitute said means for reducing the gap between the stator winding and one of the coil end section and the slot side section.

According to a further aspect of the present invention, there is provided a stator having an insulating bobbin for disposition between a stator core and a stator winding of a stator of a rotating machine, the stator winding being wound around the stator core by way of the insulating bobbin, the insulating bobbin comprising a coil end section at which an end portion of the stator winding is disposed, a slot side section forming a slot for winding thereon the stator winding, and a corner section having a curved surface and connecting between the coil end section and the slot side section, the corner section having a part-elliptic cross sectional shape which is formed by a quarter of an ellipse.

DESCRIPTION OF THE PREFERRED EMBODIMENTS

Hereinafter, preferred embodiments of the present invention will be described with reference to attached drawings.

An insulating bobbin according to a first embodiment of the present invention is used for a rotating machine as for example disclosed by the above-described Japanese Patent No. 3679305. The rotating machine is made up of a stator fixedly disposed inside a casing and a rotor disposed inside the stator so as to provide a predetermined space therebetween and rotatable with a rotating shaft. As disclosed in the above-described patent, the stator is made up of a cylindrical stator core and a stator winding. Generally, an insulating bobbin is fitted on a tooth portion of the stator core, and the stator winding is of a direct-wound type and wound on the tooth portion by way of the insulating bobbin.

Figure 1:
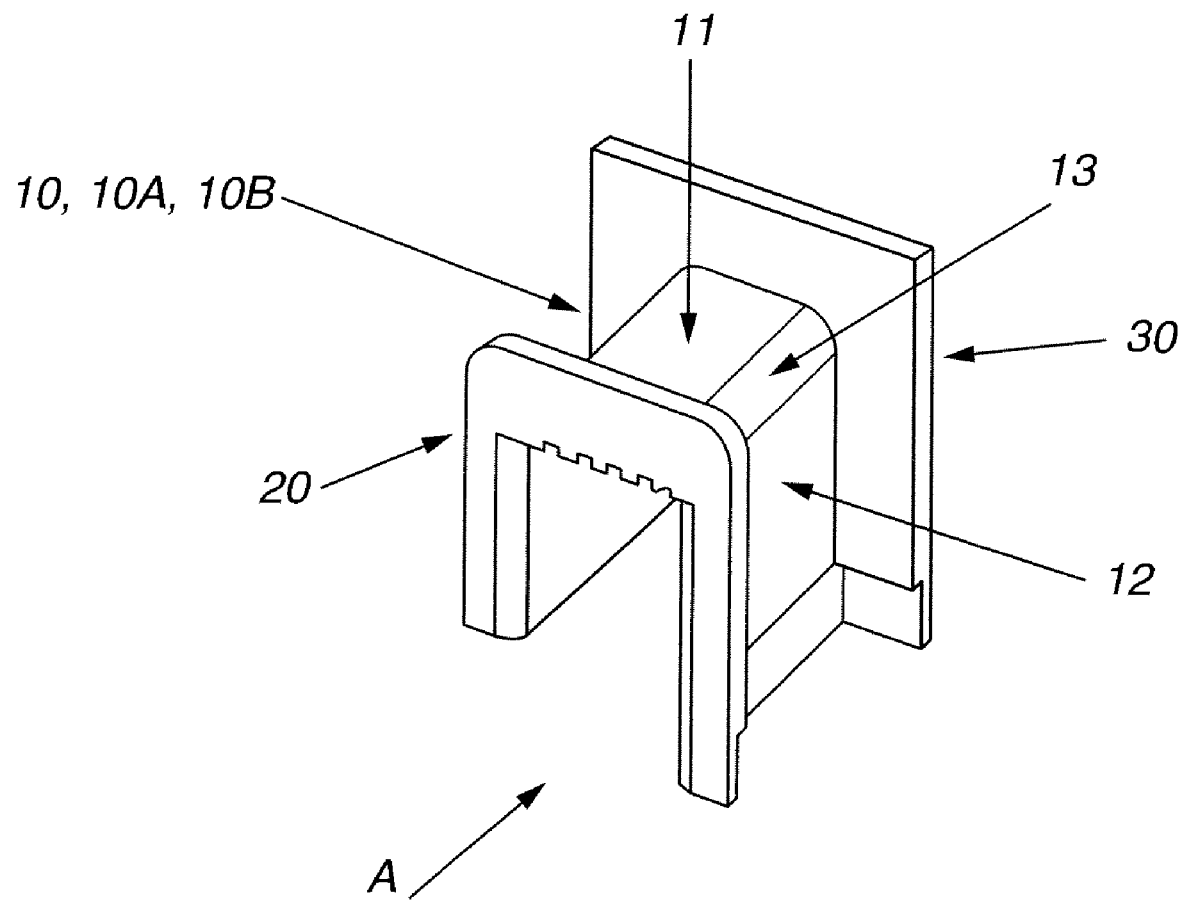
FIG. 1 is a perspective view of an upper half of an insulating bobbin to which the present invention is applied.

Herein, the insulating bobbin has such a structure shown in FIG. 1.

As shown in FIG. 1, the insulating bobbin includes a coil wound portion 10, an inner flange portion 20 attached to the coil wound portion 10 so as to extend along the inner peripheral edge of the stator, and an outer flange portion 30 attached to the coil wound portion 10 so as to extend along the outer peripheral edge of the stator. The coil wound portion 10 is in the form of a rectangular frame and is fitted at an inner surface on the tooth portion (pole tooth portion) of the stator, which has a rectangular cross section.

Further, the coil wound portion 10 is made up of a coil end section 11 at which an end portion of a stator winding 50 (refer to FIG. 3) is located, a slot side section 12 forming a winding slot for winding thereon the stator winding 50, and a corner section 13 smoothly connecting between the coil end section 11 and the slot side section 12. The stator winding 50 wound around the coil wound portion 10, extends from the coil end section 11 on an upper side and is bent at the corner section 13 connected to an end of the coil end section 11 for thereby being wound on the slot side section 12. Then, the stator winding 50 extends through a lower half of an insulating bobbin which is fitted on the tooth portion of the stator core at the side opposite to the upper half of the insulating bobbin and returns to another slot side section 12 that is located opposite to the former slot side section 12. The stator winding 50 is bent at the corner section 13 and wound on the coil end section 11 on the upper side for thereby forming a first turn of the winding. Thereafter, the winding is repeated as many times as necessary so that a predetermined number of turns of the stator winding 50 is obtained.

Hereinafter, the structure of the insulating bobbin of FIG. 1, which is installed on a stator core of a stator, will be described in detail by using a cross sectional view of the coil wound portion 10, that is taken along a plane perpendicular to the direction of arrow A of FIG. 1.

First Embodiment

Figure 2:
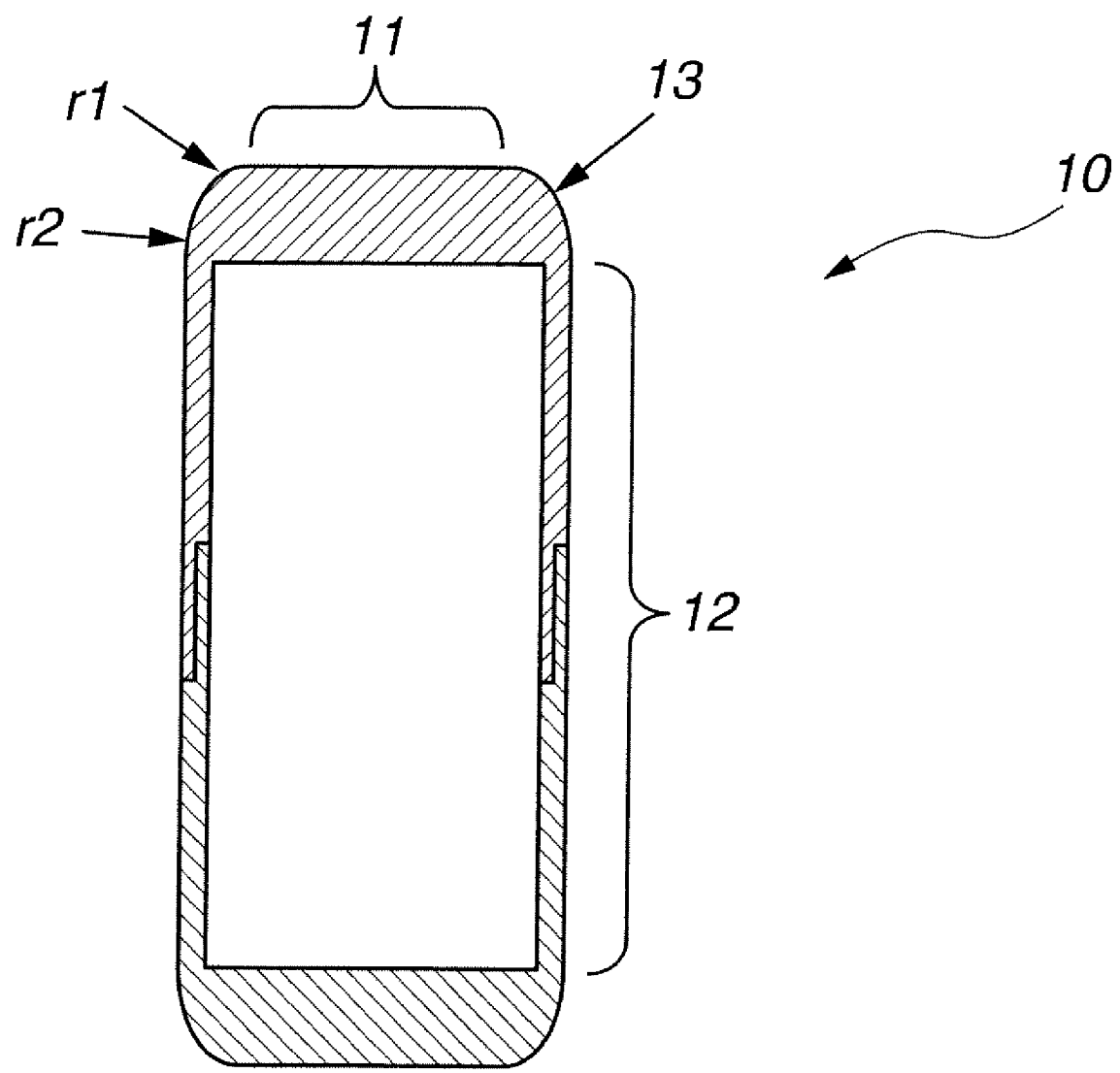
FIG. 2 is a sectional view of an insulating bobbin according to a first embodiment of the present invention.

Firstly, the insulating bobbin according to the first embodiment of the present invention will be described with reference to FIG. 2. FIG. 2 is a sectional view of the insulating bobbin of the first embodiment, which is taken along a plane perpendicular to the direction of arrow A of FIG. 1.

In this embodiment, as shown in FIG. 2, the corner section 13 of the coil wound portion 10 is not rounded to have a single circular arc shape when viewed in cross section as in a prior art structure but to have a curved surface shape that is obtained by smoothly connecting a plurality of circular arcs (at least two circular arcs) that are arranged so that the radii of the circular arcs vary stepwise from the coil end section 11 on the upper side to the slot side section 12 on the lateral side sequentially, i.e., the corner section 13 is rounded to have a curved surface shape which is composed of a plurality of curved surface portions of different radius of curvatures. For example, the corner section 13 is rounded to have, when viewed in cross section, a curved surface shape which increases in radius of curvature sequentially from the coil end section 11 to the slot side section 12.

In this embodiment of FIG. 2, the corner section 13 is rounded to have a curved surface shape which is obtained by using two circular arcs, i.e., by using a circular arc r1 that is positioned closer to the coil end section 11 on the upper side and a circular arc r2 that is positioned closer to the slot side section 12 on the lateral side, which two circular arcs are connected by a smoothly curved surface. In this connection, for example, the radius of the circular arc r2 that is positioned closer to the slot side section 12 having a larger surface than the coil end section 11 is made larger than that of the circular arc r1 that is positioned closer to the coil end section 11.

By making larger, as shown in FIG. 2, the radius of the circular arc r2 positioned closer to the slot side section 12 than the radius of the circular arc r1 positioned closer to the coil end section 11 and connecting the circular arcs by a smoothly curved surface for thereby making the corner section have a curved surface shape when viewed in cross section, the reaction of the stator winding at the time the stator winding is bent at the corner section 13 becomes smaller at the slot side section 12 side where the radius is larger than at the coil end section 11 side.

As a result, the stator winding 50 can be bent more fittingly around the slot side section 12 and it becomes more hard for a space to be formed between the stator winding 50 and the slot side section 12 having a larger surface than the coil end section 11. Namely, "wound expansion" can be made smaller, and it becomes more difficult for a space to be formed between the insulating bobbin and the stator winding 50. Accordingly, since the space (air layer) having a low thermal conductivity is made smaller, the thermal resistance can be decreased and the output torque characteristics of the rotating machine can be improved.

Figure 3:
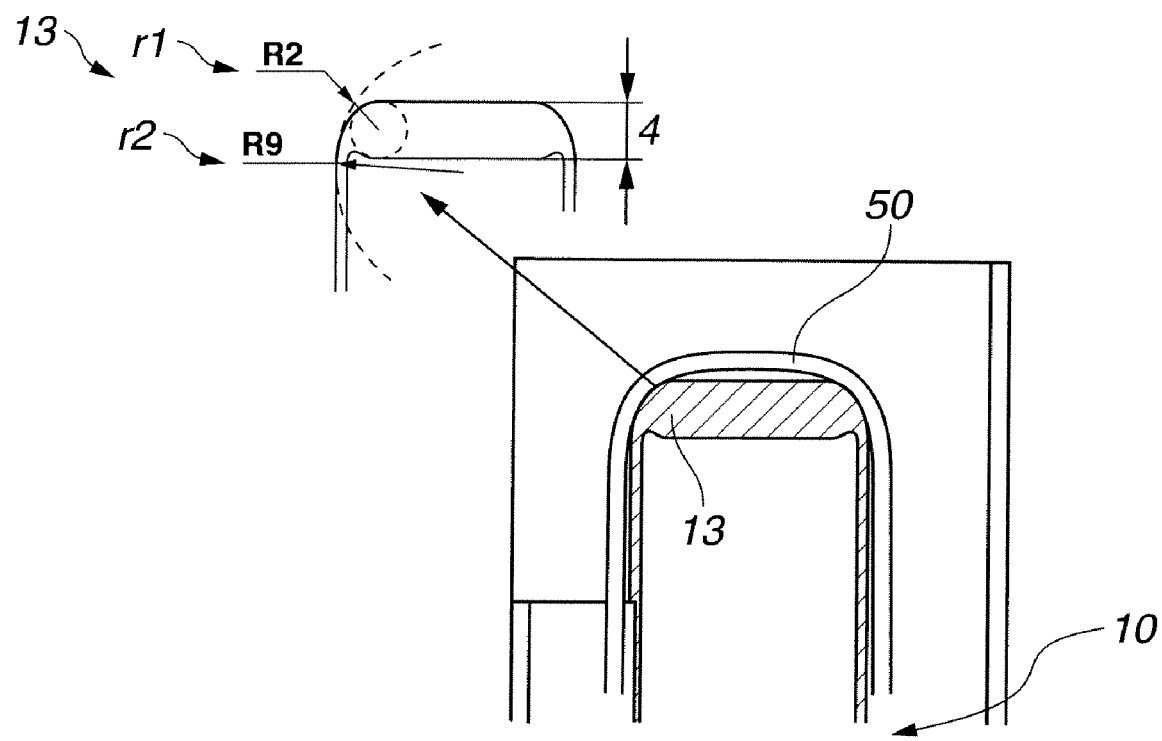
FIG. 3 is a view showing an experimental example of the insulating bobbin of the first embodiment.
Figure 4:
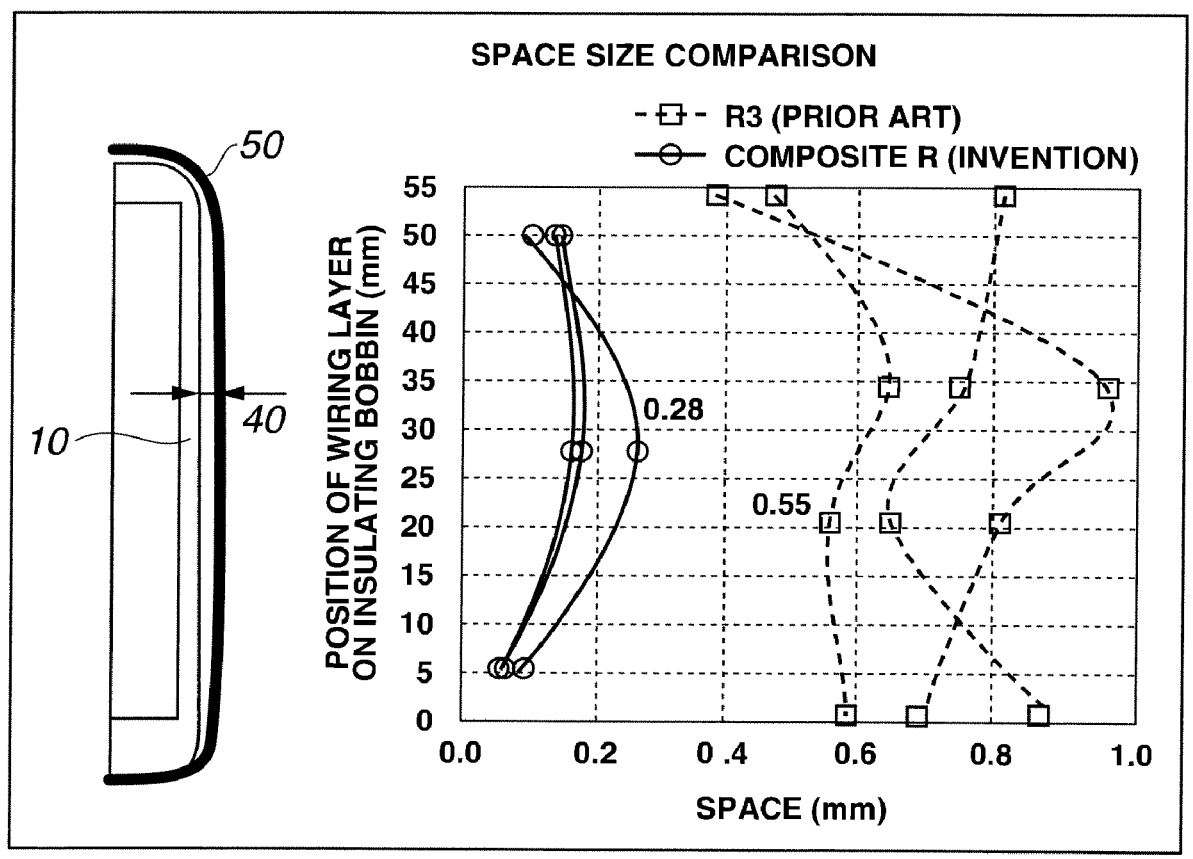
FIG. 4 is a view showing a wound expansion reducing effect attained by the structure of the insulating bobbin of FIG. 3.
Figure 5:
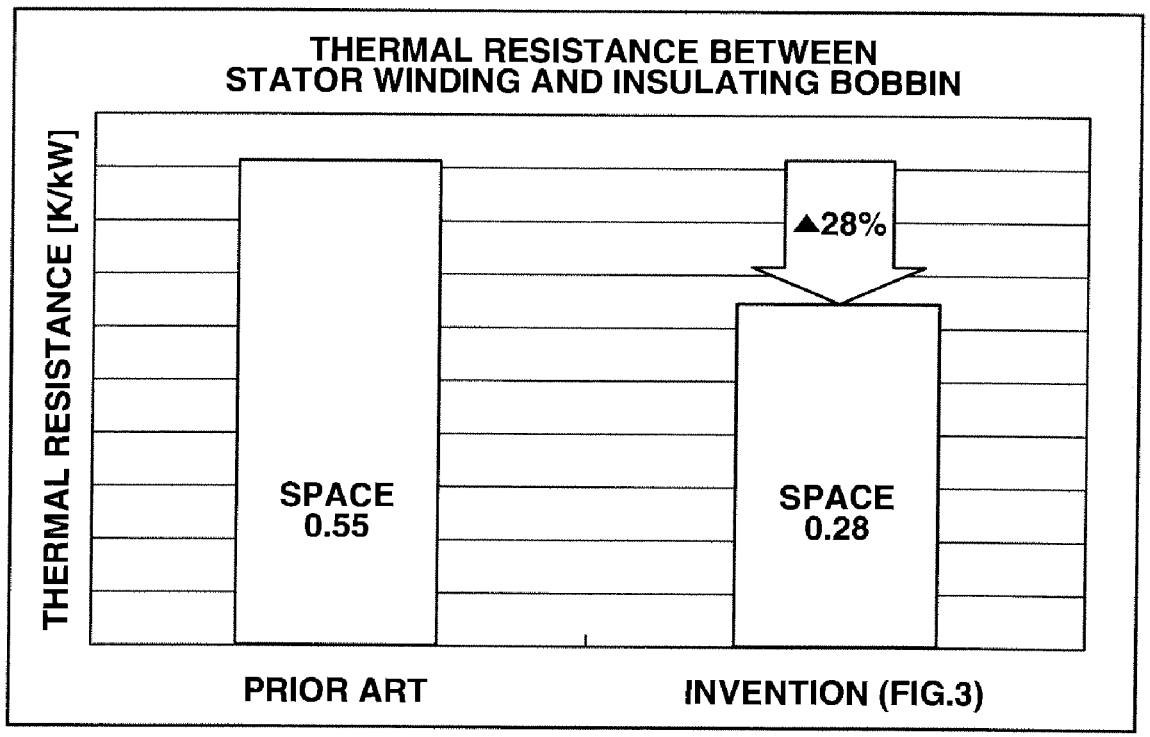
FIG. 5 is a view showing a thermal resistance reducing effect attained by the structure of the insulating bobbin of FIG. 3.

In case an experimental example of this embodiment having, for example, such a corner section shown in FIG. 3 is prepared, such a space ("wound expansion") reducing effect shown in FIG. 4 is obtained, and as a result, such a thermal resistance reducing effect as shown in FIG. 5 can be obtained.

In the meantime, for comparison of the effect of the insulating bobbin of this embodiment with that of the prior art, three examples of this embodiment and three comparative examples according to the prior art, in which the corner section was rounded to have a curved surface shape that was obtained by using a single circular arc of the radius of 3 mm, were prepared, respectively and subjected to the test. The result of the test is shown in FIG. 4.

In this connection, in the experimental example of the insulating bobbin of this embodiment, as shown in FIG. 3, the corner section 13 is rounded so that the circular arc r1 at the position closer to the coil end section 11 is 2 mm, the circular arc r2 at the position closer to the slot side section 12 is 9 mm and the height of the corner section 13 (i.e., the vertical distance between the coil end section 11 at the upper side and the upper end of the slot side section 12) is 4 mm.

In case, as shown in FIG. 3, the corner section 13 is rounded to have a smoothly curved surface shape consisting of two circular arcs r1 and r2 of different radii, the largest space between the stator winding 50 and the insulating bobbin due to "wound expansion" is 0.28 mm as shown in FIG. 4. On the other hand, in case of the prior art insulating bobbin in which the corner section is rounded to have a curved surface shape that is obtained by using a single circular arc (having a radius of 3 mm), even the smallest space is 0.55 mm and the space that was two times as large as the largest space of the examples of this embodiment.

As shown in FIG. 4, by making the corner section 13 have a curved surface shape consisting of a plurality of circular arcs which are of different radii and connected smoothly, the space due to "wound expansion" can be reduced considerably as compared with a case where the corner section is rounded to have a curved surface shape that is obtained by using a single circular arc according to prior art.

As a result, as shown in FIG. 5, even in case of the largest space of the examples of this embodiment due to "wound expansion", which is 0.28 mm, the thermal resistance can be reduced by 28% as compared with the smallest space of the comparative examples (the corner section being rounded to have a curved surface shape that is obtained by a single circular arc of 3 mm) according to the prior art, which is 0.55 mm.

As described above, by making the corner section 13 have a curved surface shape which is obtained by making the radii of a plurality of circular arcs for forming the corner section 13 vary stepwise from the coil end section 11 at the upper side toward the slot side section 12 at the lateral side and smoothly connecting the circular arcs, the space due to "wound expansion" can be smaller and the thermal resistance can be decreased, thus making it possible to make higher the space factor of the stator winding and improve the output torque characteristics of the rotating machine.

Second Embodiment

Figure 6:
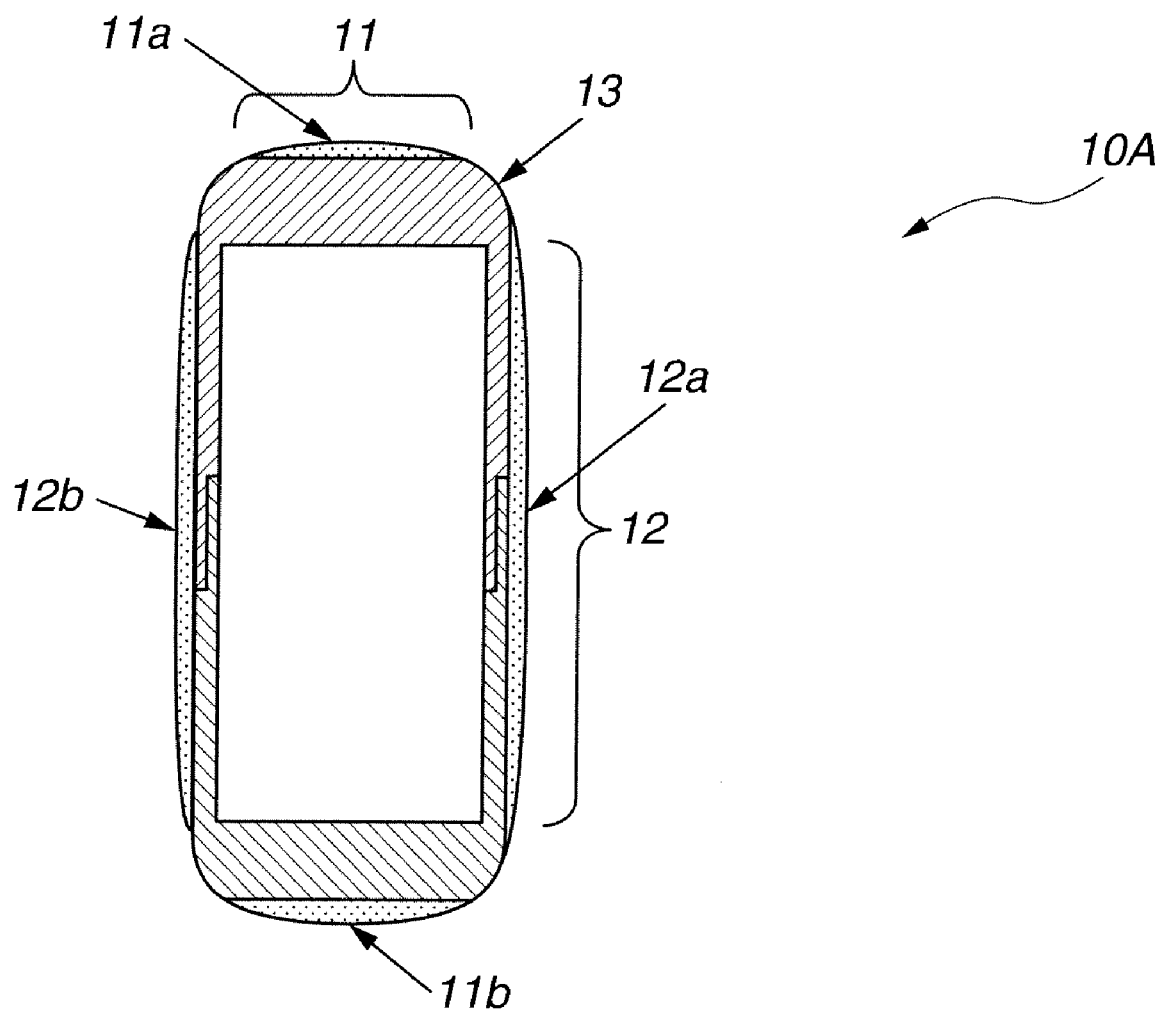
FIG. 6 is a sectional view of an insulating bobbin according to a second embodiment of the present invention.

Then, the insulating bobbin according to the second embodiment of the present invention will be described with reference to FIG. 6. FIG. 6 is a sectional view of the insulating bobbin of the second embodiment, which is taken along a plane perpendicular to the direction of the arrow A of FIG. 1.

Even with the insulating bobbin of the first embodiment having been described with reference to FIG. 2, in which the corner section 13 is rounded to have, when viewed in cross section, a curved surface shape consisting of a plurality of circular arcs of radii that are varied stepwise from the upper coil end section 11 at the upper side to the slot side section 12 at the lateral side, there is a possibility that a quite small space due to "wound expansion" is caused as seen from the test result of FIG. 4 (in case of the example in which two circular arcs of radii of 2 mm and 9 mm are used, there is caused a space 40 (refer to FIG. 4) which is 0.28 mm in maximum, so that there may still remain a case in which the thermal resistance is not sufficiently reduced.

By this embodiment, for improvement of such a situation, the size of the space 40 that will possibly be caused due to "wound expansion" is previously expected before the stator winding 50 is actually wound around the insulating bobbin, and the coil end sections 11 and the slot side sections 12 are provided with thickened wall sections 11a, 11b, 12a and 12b that correspond in size to the expected spaces 40, respectively.

Namely, in the coil wound portion 10A of the insulating bobbin of FIG. 6, in addition to the corner section 13 that is rounded to have, when viewed in cross section, a curved surface shape consisting of circular arcs whose radii are varied stepwise, the upper and lower coil end sections 11 are formed with integral, thickened wall sections 11a and 11b corresponding in size to the spaces 40 expected to be caused thereat, respectively, and the slot side sections 12 at the left and right lateral sides are formed with integral, thickened wall sections 12a and 12b corresponding in size to the spaces 40 expected to be caused thereat.

In this connection, the thicknesses of the thickened wall sections 11a, 11b and the thickened wall sections 12a, 12b correspond in size to the spaces that are expected to be caused due to "wound expansion". Accordingly, the thickened wall sections 11a, 11b and the thickened wall sections 12a, 12b have outer surfaces that are smoothly curved so that they do not have any thickness at the corner sections 13 but increases in thickness as they extend closer to the central portions thereof and become maximally thick at the respective central portions of the coil end section 11 and the slot side section 12.

In the meantime, the thickened wall sections 11a, 11b, 12a and 12b are arranged and smoothly connected with the respective corner sections 13 so that the direction of tangent to the curved surface of each thickened wall section 11a, 11b, 12a or 12b coincides with the direction of tangent to the curved surface of the corresponding corner section 13.

Further, according to the size of the space 40 that is expected to be caused, the coil end sections 11 and the slot side sections 12 may both be formed with the thickened wall sections 11a, 11b, 12a and 12b, or either of the coil end sections 11 or the slot side section 12 may be formed with the thickened wall sections 11a and 11b or 12a and 12b, depending on a situation.

By forming on the coil end sections 11 and the slot side sections 12, as described above, the integral thickened wall sections 11a, 11b and the integral thickened wall sections 12a, 12b, which correspond to the spaces 40 that are expected to be caused at the respective sections, the spaces 40 due to "wound expansion" can be made smaller than those having been described with respect to the first embodiment and the thermal resistance can be decreased further. As a result, the space factor of the stator winding 50 can be improved further and the output torque characteristics of the rotating machine can be improved further.

Figure 7:
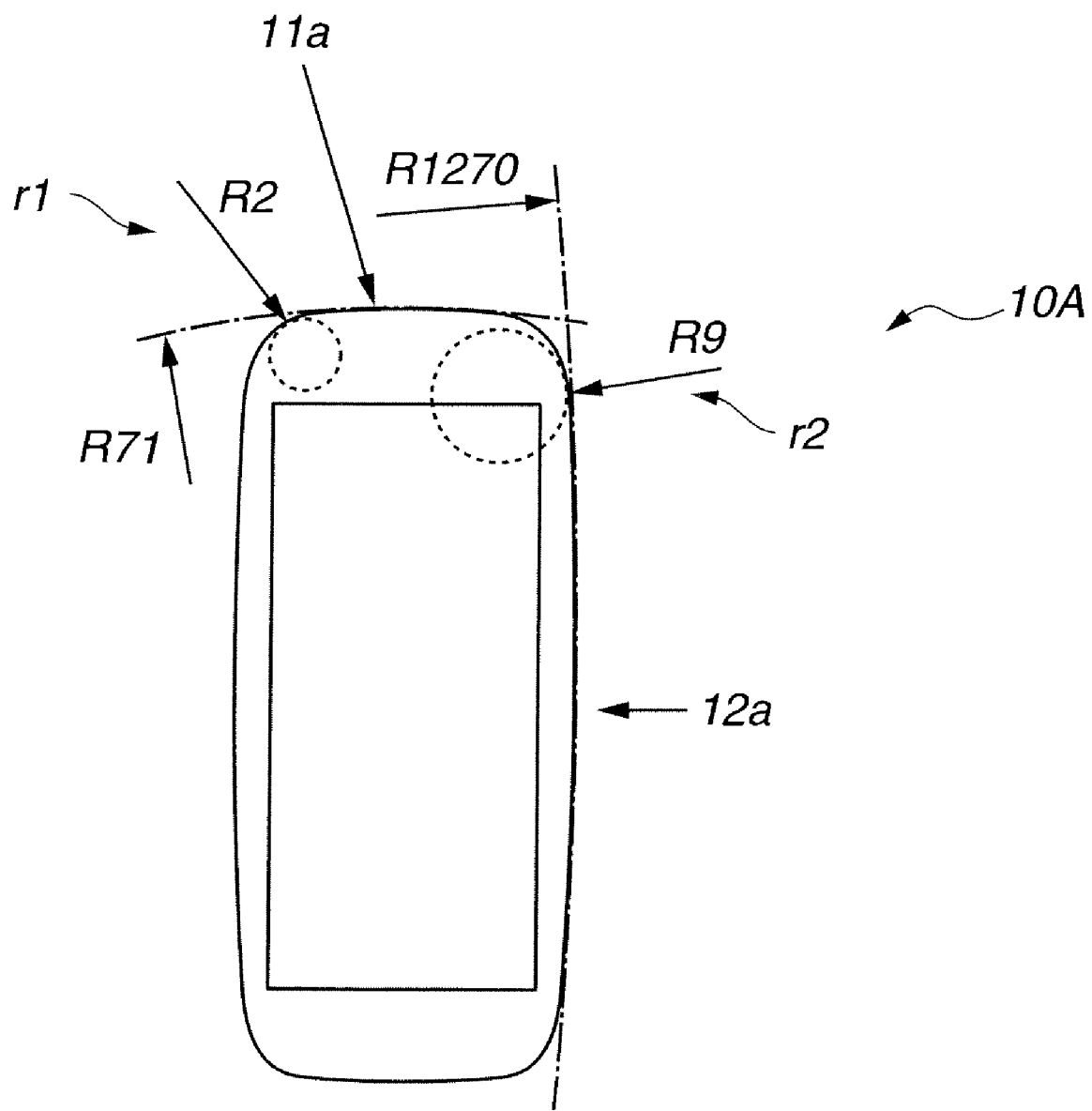
FIG. 7 is a view showing an experimental example of the insulating bobbin of the second embodiment.

An example of this embodiment, which had such a corner section shown in FIG. 7, was prepared and subjected to a test for the thermal resistance. By the test, it was found that this embodiment had such a thermal resistance reducing effect shown in FIG. 8.

As shown in FIG. 7, the example of the insulating bobbin of this embodiment has a corner section that is structured so that similarly to the example of FIG. 3, the radius of the circular arc r1 closer to the coil end section 11 is 2 mm, the radius of the circular arc r2 closer to the slot side section 12 is 9 mm and the height of the corner section is 4 mm. In addition, the example of the insulating bobbin of this embodiment has on the coil end sections 11 and the slot side sections 12, integral thickened wall sections 11a and 11b having a curved outer surface formed by a circular arc of a radius of 71 mm and integral thickened wall sections 12a and 12b having a curved outer surface formed by a circular arc of a radius of 1270 mm.

In this connection, the circular arc r1 of the radius of 2 mm, which forms part of the corner section 13 and positioned closer to the coil end section 11, and the circular arc of radius of 71 mm, which forms the thickened wall section 11a or 11b, are smoothly connected so that the direction of tangent to the corner section 13 and the direction tangent to the curved surface of the thickened wall section 11a or 11b coincide with each other at joining curved surface portions of the corner section 13 and the thickened wall section 11a or 11b (i.e., coil end section 11). Further, the circular arc r2 of the radius of 9 mm, which forms part of the corner section 13 and positioned closer to the slot side section 12, and the circular arc of the radius of 1270 mm, which forms the thickened wall section 12a or 12b, are smoothly connected so that the direction of tangent to the curved surface of the corner section 13 and the direction of tangent to the curved surface of the thickened wall section 12a or 12b coincide with each other at joining curved surface portions of the corner section 13 and the thickened wall section 12a or 12b (i.e., slot side section 12).

By the test of the example in which the coil end section 11 and the slot side section 12 are formed to have smoothly curved outer surfaces by forming thereon additional thickened wall sections 11a, 11b, 12a and 12b that fill the spaces 40 expected to be caused due to "wound expansion", it was found that the space 40 that was caused between the stator winding 50 and the insulating bobbin could be considerably reduced to 0.05 mm or less. Namely, as compared with the smallest space (0.55 mm) of the prior art insulating bobbin having the corner section formed by a single circular arc (of the radius of 3 mm), the space 40 can be reduced to about 1/10. Further, as compared with the largest space (0.28 mm) of the example of the first embodiment of FIG. 3, the space 40 can be reduced to about 1/6. Thus, by this embodiment, the space 40 can be made quite small.

Figure 8:
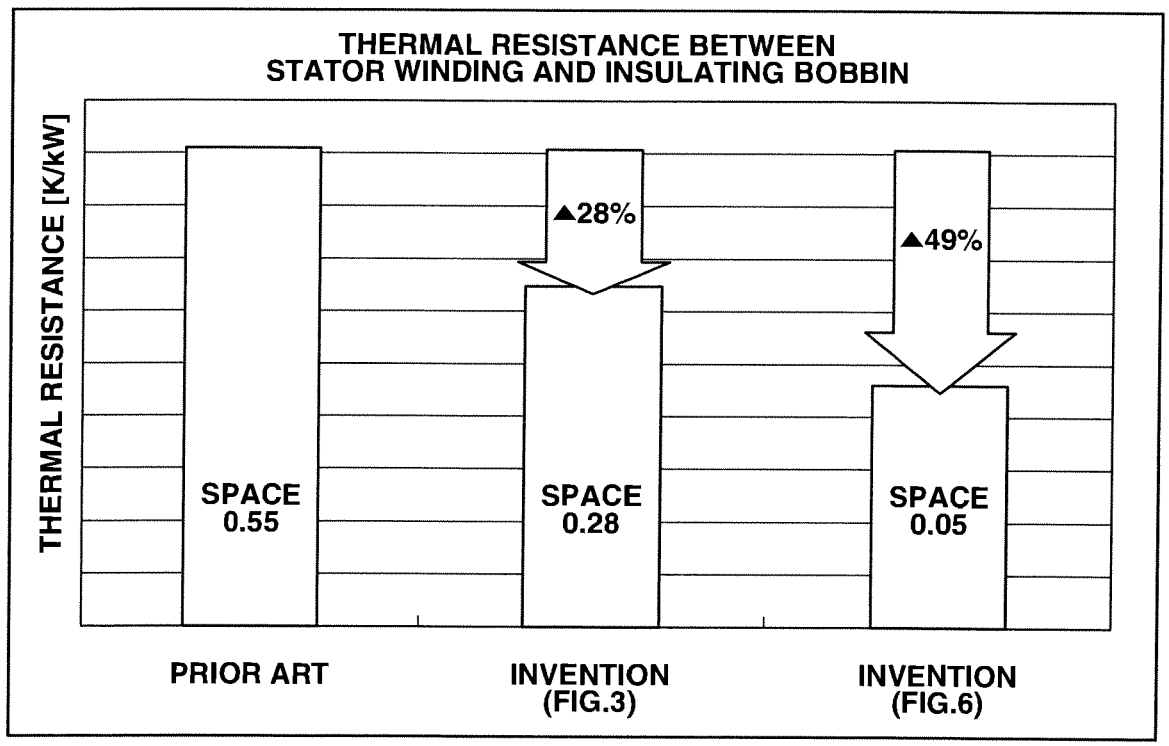
FIG. 8 is a view showing a thermal resistance reducing effect attained by the structure of the insulating bobbin of FIG. 7.

As a result, as shown in FIG. 8, even in the case where the largest space 40 due to "wound expansion" in the example of this embodiment is 0.05 mm, the thermal resistance can be reduced by about 49% as compared with the case where the smallest space due to "wound expansion" in the comparative example according to the prior art, which has a corner section of the radius of 3 mm, is 0.55 mm.

By forming additionally on the surfaces of the coil end sections 11 and the slot side sections 12, as described above, the integral thickened wall sections 11a, 11b and the integral thickened wall sections 12a, 12b that fill the spaces 40 expected to be caused due to "wound expansion" while making the corner sections 13 have, when viewed in cross section, a curved surface shape that is obtained by stepwisely varying the radii of the circular arcs, the size of the spaces 40 due to "wound expansion" can be reduced considerably and the thermal resistance can be reduced further, thus making it possible to increase the space factor of the stator winding 50 further and improve the output torque characteristics of the rotating machine further.

In the meantime, while the thickened wall sections 11a, 11b and the thickened wall sections 12a, 12b have been described and shown as being formed integral with the coil end sections 11 and the slot side sections 12 by being attached thereto additionally, e.g., by being bonded thereto after being prepared separately therefrom, it is needless to say that the coil end sections 11 and the slot side sections 12 may include the thickened wall sections 11a, 11b and the thickened wall sections 12a, 12b so as to be produced integrally therewith as a single unit.

Third Embodiment

Figure 9:
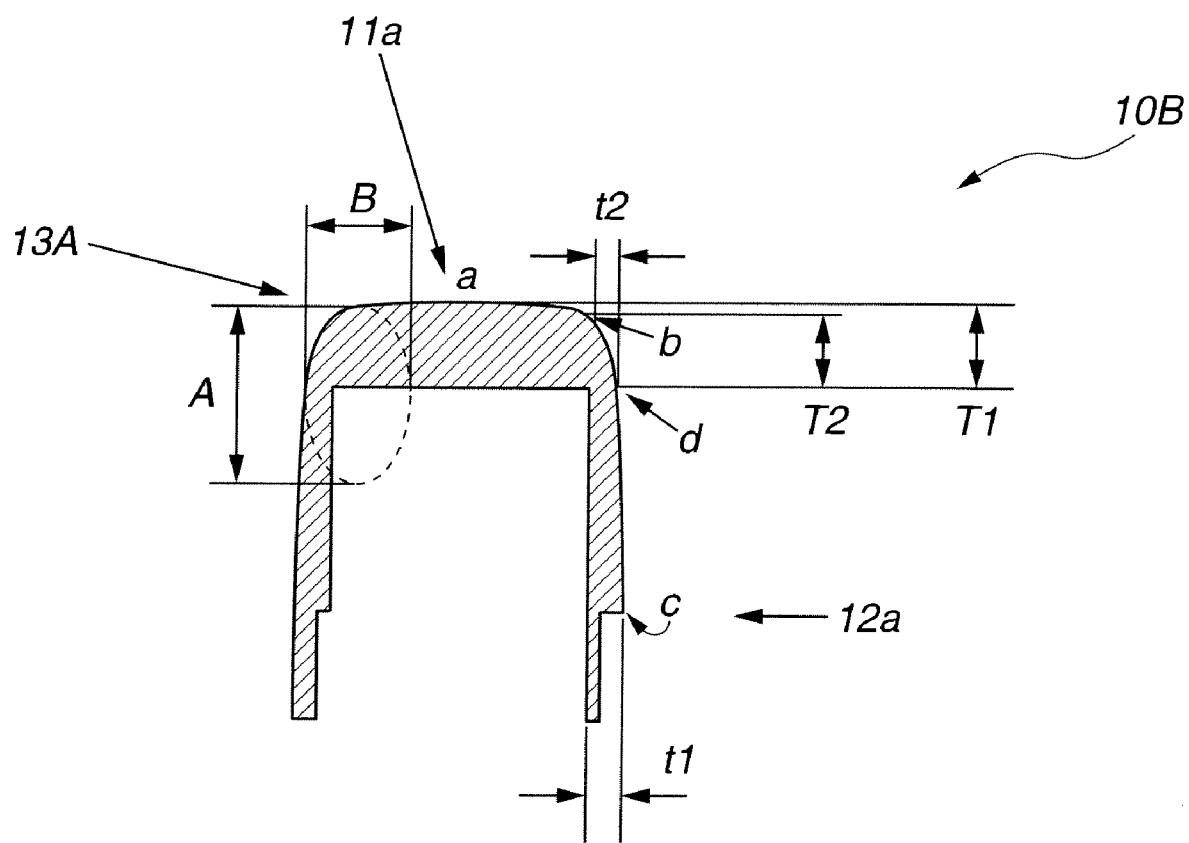
FIG. 9 is a sectional view of an insulating bobbin according to a third embodiment of the present invention.

Then, the insulating bobbin according to the third embodiment of this invention will be described with reference to FIG. 9. FIG. 9 is a sectional view of the insulating bobbin of the third embodiment, which is taken along a plane perpendicular to the direction of the arrow A of FIG. 1.

This embodiment is concerned with modified corner sections that are different in shape from the corner sections 13 of the first embodiment and modified thickened wall sections that are different in shape from the thickened wall sections 11a, 11b and the thickened wall sections 12a, 12b. Namely, in this embodiment, the corner section 13A is rounded to have a part-elliptic cross sectional shape corresponding to a curved surface shape obtained by varying the radii of a plurality of circular arcs continuously, and the ratio between the long axis and short axis of the ellipse is determined to be in a predetermined range. Further, the curved surface shapes of the coil end sections 11 and the slot side sections 12, which are integrally formed with the thickened wall sections 11a, 11b and the thickened wall sections 12a, 12b, respectively, are determined so that the ratio between the maximum thickness and the minimum thickness of the coil end sections 11 and the ratio between the maximum thickness and the minimum thickness of the slot side section 12 are in respective predetermined ranges.

In the meantime, also in this embodiment, the thickened wall sections 11a, 11b and the thickened wall sections 12a, 12b are arranged and smoothly connected with the respective corner sections 13A so that the direction of tangent to the curved surface of each thickened wall section 11a, 11b, 12a or 12b and the direction to tangent to the curved surface of the corner section 13A coincide with each other at joining surface portions of the thickened wall section 11a, 11b, 12a or 12b and the corner section 13A.

Firstly, the corner section 13A will be described. The corner section 13A of the coil wound portion 10B of FIG. 9, differing from the corner section 13 of the first embodiment of FIG. 3, which is rounded to have, when viewed in cross section, a curved surface shape obtained by connecting circular arcs of different radii by a smoothly curved surface, is rounded to have, when viewed in cross section, a curved surface shape that is obtained by using nearly ¼ turn of elliptic arc extending between points where ends of long and short axes of an ellipse are positions, i.e., a curved surface shape that is a quarter of an ellipse. Further, the corner section 13A having a part-elliptic cross sectional shape is formed by an ellipse that has a short axis extending in the horizontal direction of the coil wound portion 10B (i.e., in the direction parallel to the coil end section 11a that has a smaller surface than the slot side section) and a long axis extending in the vertical direction of the coil wound portion 10B (i.e. in the direction parallel to the slot side section).

In this connection, assuming that "A" is the length of the long axis of the elliptic shape and "B" is the length of the short axis of the elliptic shape, the ratio of A:B is determined to be in a predetermined range that is determined based on the space 40 (refer to FIG. 4) that is expected to caused at the coil end section 11 and/or the space 40 that is expected to be caused at the slot side section 12 due to "wound expansion" when the stator winding 50 (refer to FIG. 3 or 4) is wound around the insulating bobbin. For example, for reducing the size of the space 40 due to "wound expansion" caused by the curved surface shape of the corner section 13A and inhibiting increase of the thermal resistance sufficiently, it is preferable that the ratio of A:B is determined to be in the range from 4:1 to 6:1 and more preferably the ratio of A:B is determined to be about 5:1, i.e., A:B≈5:1.

Further, the coil wound portion 10B of FIG. 9 is shown to further include a modification of the thickened wall sections 11a, 11b and the thickened wall sections 12a, 12b of the second embodiment.

Also in the embodiment of FIG. 9, the surface shapes of the thickened wall sections 11a, 11b, which form the surface shapes of the coil end sections 11 and/or the surface shapes of the thickened wall sections 12a, 12b, which form the surface shapes of the slot side sections 12, are formed into the curved surface shapes similarly to the second embodiment. However, in this embodiment, the difference between the maximum thickness and the minimum thickness of the coil end section 11 which includes the integral thickened wall sections 11a, 11b is determined to be in a range which is previously determined based on the space 40 that is expected to be caused due to "wound expansion" at the coil end section 12 and/or the difference between the maximum thickness and the minimum thickness of the slot side section 12 which includes the integral thickened wall sections 12a, 12b, is determined to be in a range that is previously determined based on the space 40 that is expected to be caused due to "wound expansion" at the slot side section 12.

Namely, the surface shapes of the thickened wall sections 11a, 11b integral with the coil end section 11 are determined so that the difference between the maximum thickness T1 and the minimum thickness T2 of the coil end section 11 is in a predetermined range, while the thickened wall sections 11a, 11b including portions joined with the corner sections 13A being formed into smoothly curved shapes. The maximum thickness T1 is the thickness of the coil end section 11 at the point "a" and the minimum thickness of the coil end section 11 is the thickness of the coil end section at the end thereof, i.e., at the joint "b" at which the coil end section 11 is joined with the corner section 13A.

For example, the surface shape of the coil end section 11 formed integral with the thickened wall sections 11a, 11b can be formed into a circular arc that passes three points, i.e., the point "a" at the central part of the coil end section 11 and the joints "b" at the opposite ends of the coil end section 11, at which the coil end section 11 is joined with the corner section 13A.

In the meantime, while the difference between the maximum thickness T1 and the minimum thickness T2 is determined to be in a predetermined range as described above, it is preferable to determine the difference between the maximum thickness T1 and the minimum thickness T2 in the range from about 0.1 to 0.3 mm for reducing the space 40 due to "wound expansion" by means of the curved surface shape of the coil end section 11 and thereby inhibiting increase of the thermal resistance sufficiently.

Similarly, the surface shapes of the thickened wall sections 12a, 12b integral with the slot side section 12 are determined so that the difference between the maximum thickness t1 and the minimum thickness t2 of the slot side section 12 is in a predetermined range, while the thickened wall sections 12a, 12b including portions joined with the corner sections 13A being formed into smoothly curved shapes. The maximum thickness t1 is the thickness of the slot side section 12 at the point "c" and the minimum thickness of the slot side section 12 is the thickness of the slot side section at the end thereof, i.e., at the joint "d" at which the slot side section 12 is joined with the corner section 13A.

For example, similarly to the coil end section 11, the surface shape of the slot side section 12 formed integral with the thickened wall sections 12a and 12b can be formed into a circular arc that passes three points, i.e., the point "c" at the central part of the slot side section 12 and the joints "d" at the opposite ends of the slot side section 12, at which the slot side section 12 is joined with the corner section 13A.

In the meantime, while the difference between the maximum thickness t1 and the minimum thickness t2 is determined to be in a predetermined range as described above, it is preferably determined to be in the range from about 0.1 to 0.3 mm, similarly to the coil end section 11, for reducing the space due to "wound expansion" by means of the curved surface shape of the slot side section 12 and thereby inhibiting increase of the thermal resistance sufficiently.

In this connection, depending upon how the spaces due to "wound expansion" are caused, both of the coil end section 11 and the slot side section 12 can be provided with the thickened wall sections 11a, 11b and the thickened wall sections 12a, 12b, or depending on a situation only one of them may be formed with the thickened wall sections.

By making the corner section 13A have a part-elliptic cross sectional shape whose radius of curvature varies continuously and determining the ratio between the length A of the long axis and the length B of the short axis to be in a predetermined range, and/or by determining the curved surface shapes of the coil end section 11 and the slot side section 12, which are formed integral with the thickened wall sections 11a, 11b and the thickened wall sections 12a, 12b, respectively, so that the difference between the maximum thickness and the minimum thickness of each of the coil end section 11 and the slot side section 12 is in a predetermined range, the same effects as the first and second embodiments can be obtained. Namely, it becomes possible to reduce the spaces due to "wound expansion" and make lower the thermal resistance, thus making it possible to make higher the space factor of the stator winding and improve the output torque characteristics of the rotating machine.

In the meantime, while the thickened wall sections 11a, 11b and the thickened wall sections 12a, 12b have been described and shown as being formed integral with the coil end sections 11 and the slot side sections 12 by being attached thereto additionally, e.g., by being bonded thereto after being prepared separately therefrom, it is needless to say that the coil end sections 11 and the slot side sections 12 may include the thickened wall sections 11a and 11b and the thickened wall sections 12a and 12b so as to be produced integrally therewith as a single unit.

Fourth Embodiment

The insulating bobbin according to the fourth embodiment of the present invention will be described with reference to FIG. 10.

Figure 10:
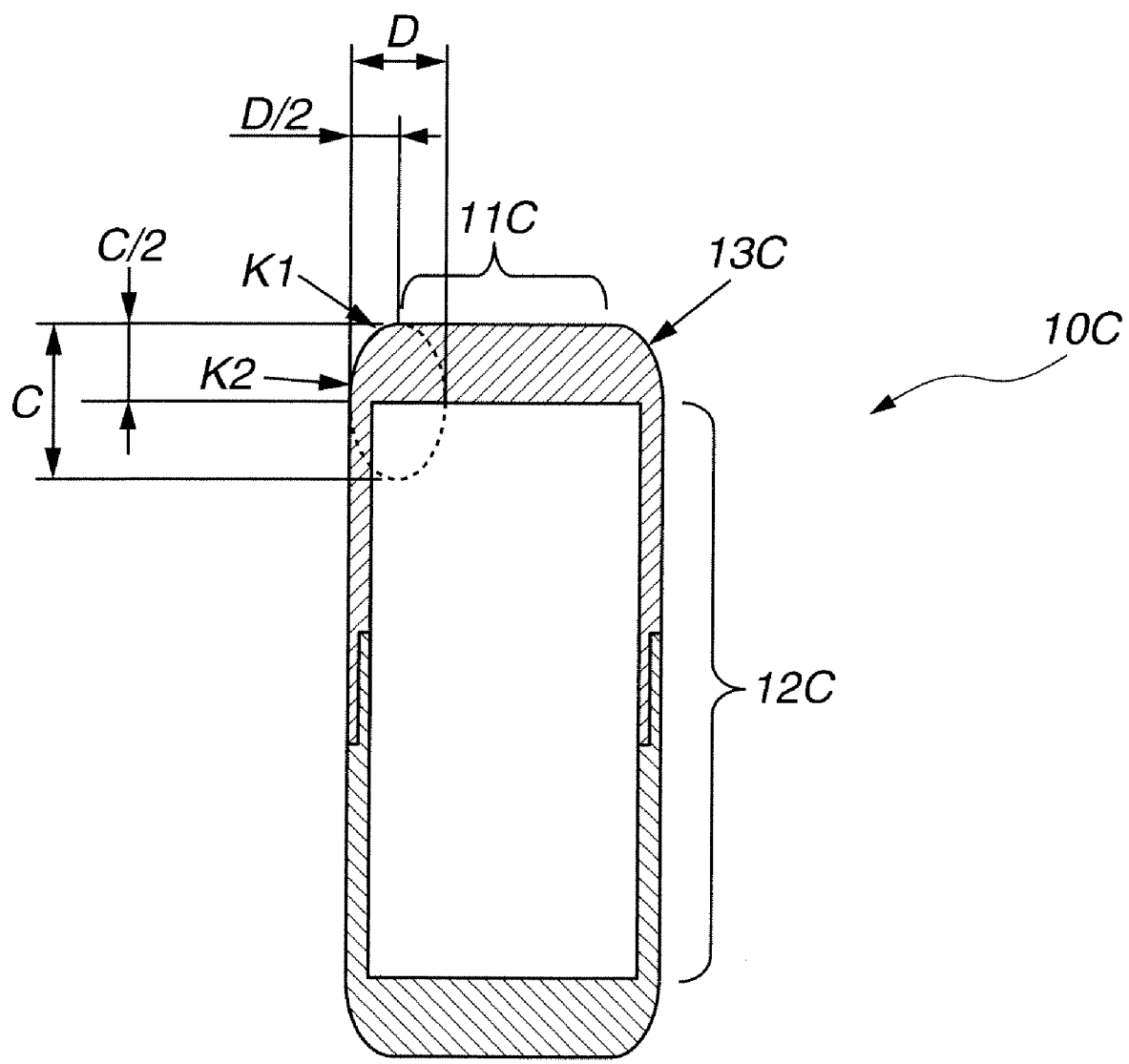
FIG. 10 is a sectional view of an insulating bobbin according to a fourth embodiment of the present invention.

As shown in FIG. 10, the corner section 13C of the coil wound portion 10C of this embodiment includes a portion of a smaller radius k1 of curvature at an upper side closer to the coil end section 11C and a portion of a larger radius k2 of curvature at a side closer to the slot side section 12C. More specifically, the sectional shape of the corner section 13C is formed into an elliptic arc extending between the points at which the ends of the long and short axes are positioned, i.e., a quarter of an ellipse.

By forming the corner section 13C, as shown in FIG. 10, so that the radius k2 of curvature at a portion closer to the slot side section 12c is larger than the radius k1 of curvature at a portion closer to the coil end section 11C, the reaction force of the stator winding 50 (refer to FIG. 3 or 4) at the time the stator winding 50 is wound around the corner section 13C is weakened more at the side closer to the slot side section 12C than at the side closer to the coil end section 11C.

As a result, the stator winding 50 can be wound so as to fit on the slot side section 12C such that it becomes possible to make the space 40 (refer to FIG. 4) between the stator winding 50 and the slot side section 12C having a larger surface than the coil end section 11C be hard to be caused. Namely, "wound expansion" can be made smaller and the space 40 between the insulating bobbin and the stator winding 50 can be made hard to be caused. Accordingly, the size of the space 40 (air layer) whose thermal conductivity is low can be made smaller and the heat resistance can be lowered.

Further, by forming the corner section 13C so that the radius k1 of curvature at the side closer to the coil end section 11C is smaller than the radius k2 of curvature at the side closer to the slot side section 12C, as shown in FIG. 10, it becomes possible to inhibit the slot side section 12C from increasing in thickness while obtaining a necessary thickness of the corner section 13C. By this, an increased number of turns of stator winding can be wound around the insulating bobbin, thus making it possible to inhibit the output torque characteristics of the rotating machine from lowering.

The entire contents of Japanese Patent Application P2007-283036 (filed Oct. 31, 2007) are incorporated herein by reference.

What is claimed is:

1. An insulating bobbin for disposition between a stator core and a stator winding of a stator of a rotating machine, the stator winding being wound around the stator core by way of the insulating bobbin, the insulating bobbin comprising:
a coil end section at which an end portion of the stator winding is disposed;
a slot side section forming a slot for winding thereon the stator winding; and
a corner section having a curved surface and connecting between the coil end section and the slot side section;
the corner section having a first radius of curvature at a side closer to the coil end section and a second radius of curvature at a side closer to the slot side section, the second radius of curvature being larger than the first radius of curvature.

2. The insulating bobbin of claim 1, wherein at least a part of the corner section has a part-elliptic shape when viewed in cross section taken along a plane parallel to a direction in which the stator winding is wound around the stator core.

3. The insulating bobbin of claim 2, wherein the part-elliptic shape of the corner section is constituted by a quarter of an ellipse.

4. The insulating bobbin of claim 3, wherein the part-elliptic shape has a short axis disposed in parallel with the coil end section.

5. The insulating bobbin of claim 4, wherein a ratio of a length of a long axis of the part-elliptic shape to a length of the short axis is in a predetermined range which is determined on a basis of one of a space which is expected to be caused between the stator winding and the coil end section and a space which is expected to be caused between the stator winding and the slot side section due to wound expansion when the stator winding is wound around the stator core.

6. The insulating bobbin of claim 5, wherein the predetermined range is from 4:1 to 6:1.

7. The insulating bobbin of claim 1, wherein one of the coil end section and the slot side section has a curved surface so as to fill a space which is expected to be caused between the stator winding and said one of the coil end section and the slot side section due to wound expansion when the stator winding is wound around the stator core.

8. The insulating bobbin of claim 1, wherein one of the coil end section and the slot side section has a curved surface, a difference between a maximum thickness and a minimum thickness of said one of the coil end section and the slot side section being in a predetermined range which is determined on a basis of a space which is expected to be caused between the stator winding and said one of the coil end section and the slot side section due to wound expansion when the stator winding is wound around the stator core.

9. The insulating bobbin of claim 7, wherein a direction of tangent to the curved surface of the corner section and a direction of tangent to the curved surface of said one of the coil end section and the slot side section coincide with each other at joining surface portions of the corner section and said one of the coil end section and the slot side section.

10. The insulating bobbin of claim 1, wherein the curved surface of the corner section, when viewed in cross section, is constituted by a plurality of circular arcs of different radii that increase stepwise in a direction from the coil end section to the slot side section.

11. An insulating bobbin for disposition between a stator core and a stator winding of a stator of a rotating machine, the stator winding being wound around the stator core by way of the insulating bobbin, the insulating bobbin comprising:
a coil end section at which an end portion of the stator winding is disposed;
a slot side section forming a slot for winding thereon the stator winding;
a corner section having a curved surface and connecting between the coil end section and the slot side section; and
means for reducing a gap which is caused between the stator winding and one of the coil end section and the slot side section when the stator winding is wound around the stator core,
wherein the corner section has a first radius of curvature at a side closer to the coil end section and a second radius of curvature at a side closer to the slot side section, the second radius of curvature being larger than the first radius of curvature, and wherein the first radius of curvature and the second radius of curvature of the corner section constitute said means for reducing the gap between the stator winding and the one of the coil end section and the slot side section.

12. A stator having an insulating bobbin for disposition between a stator core and a stator winding of a stator of a rotating machine, the stator winding being wound around the stator core by way of the insulating bobbin, the insulating bobbin comprising:
   a coil end section at which an end portion of the stator winding is disposed;
   a slot side section forming a slot for winding thereon the stator winding; and
   a corner section having a curved surface and connecting between the coil end section and the slot side section;
   the corner section having a part-elliptic cross sectional shape which is formed by a quarter of an ellipse.

13. The stator of claim 12, wherein the part-elliptic cross sectional shape has a short axis disposed in parallel with the coil end section.

14. The stator of claim 12, wherein a ratio of a length of a long axis of the part-elliptic cross sectional shape to a length of a short axis is in a predetermined range which is determined on a basis of one of a space which is expected to be caused between the stator winding and the coil end section and a space which is expected to be caused between the stator winding and the slot side section due to wound expansion when the stator winding is wound around the stator core.

15. The stator of claim 14, wherein the predetermined range is from 4:1 to 6:1.

16. The stator of claim 12, wherein one of the coil end section and the slot side section has a curved surface so as to fill a space which is expected to be caused between the stator winding and the one of the coil end section and the slot side section due to wound expansion when the stator winding is wound around the stator core.

17. The stator of claim 12, wherein one of the coil end section and the slot side section has a curved surface, wherein a difference between a maximum thickness and a minimum thickness of said one of the coil end section and the slot side section is in a predetermined range which is determined on a basis of a space which is expected to be caused between the stator winding and said one of the coil end section and the slot side section due to wound expansion when the stator winding is wound around the stator core.

18. The stator according to claim 16, wherein a direction of tangent to the curved surface of the corner section and a direction of tangent to the curved surface of the one of the coil end section and the slot side section coincide with each other at joining surface portions of the corner section and said one of the coil end section and the slot side section.

19. The insulating bobbin of claim 1, wherein the corner section is formed by smoothly connecting a plurality of circular arcs.

20. The insulating bobbin of claim 1, wherein the corner section comprises a first portion extending along in a first arc trajectory that follows the first radius of curvature and a second portion extending along in a second arc trajectory that follows the second radius of curvature.

21. The insulating bobbin of claim 1, wherein the corner section comprises a first portion extending along in a first circular arc trajectory that follows the first radius of curvature and a second portion extending along in a second circular arc trajectory that follows the second radius of curvature.

* * * * *